3,767,673
INTERMEDIATES TO SUBSTITUTED DIBENZ[a,h]
AZULENONES AND 8-(OXA OR THIA) SUBSTI-
TUTED DIBENZ[a,h]AZULENONES
William J. Houlihan, Mountain Lakes, and Jeffrey Nadelson, Parsippany, N.J., assignors to Sandoz-Wander, Inc., Hanover, N.J.
No Drawing. Original application May 14, 1970, Ser. No. 37,342, now Patent No. 3,687,975. Divided and this application June 12, 1972, Ser. No. 262,065
Int. Cl. C07d 59/00
U.S. Cl. 260—327 B       1 Claim

ABSTRACT OF THE DISCLOSURE

Substituted dibenz[a,h]azulenones and 8-(oxa or thia) substituted dibenz[a,h]azulenones, e.g., 6,7-dihydro-benz-[b]indeno[1,2-d]thiepin-8(8H)-one, prepared by treating a substituted spiro[1-benzoxa or thia-5(4H)-1'-isobenzofuran]-3'-one with concentrated mineral acid. The compounds are useful as anti-depressants.

---

This is a division of application Ser. No. 37,342, filed May 14, 1970, now U.S. Pat. No. 3,687,975 issued Aug. 29, 1972.

This invention relates to dibenz[a,h]azulenones and 8-(oxa or thia)dibenz[a,h]azulenones. More particularly, it relates to substituted dibenz[a,h]azulenones and 8-(oxa or thia)substituted dibenz[a,h]azulenones, intermediates thereof and processes for their preparation.

The compounds of this invention may be represented by the following structural formula:

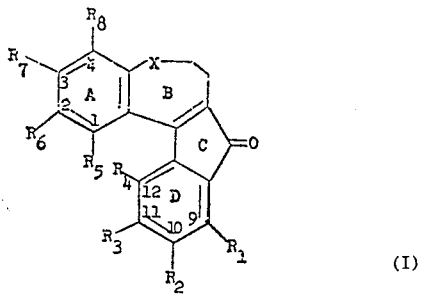

(I)

wherein $R_1$ is hydrogen, halo having an atomic weight of 19 to 36 or lower alkoxy having 1 to 4 carbon atoms, e.g., methoxy, ethoxy, propoxy, isopropoxy, butoxy or isobutoxy;

$R_2$ and $R_4$ are independently, hydrogen, lower alkyl having 1 to 4 carbon atoms, e.g., methyl, ethyl, propyl, isopropyl, butyl or isobutyl, lower alkoxy having 1 to 4 carbon atoms, e.g., methoxy, ethoxy, propoxy, isopropoxy, butoxy or isobutoxy, or trifluoromethyl;

$R_3$ is hydrogen, halo having an atomic weight of 19 to 36, lower alkyl having 1 to 4 carbon atoms, e.g., methyl, ethyl, propyl, isopropyl, butyl or isobutyl, lower alkoxy having 1 to 4 carbon atoms, e.g., methoxy, ethoxy, propoxy, isopropoxy, butoxy or isobutoxy, or trifluoromethyl;

$R_5$ and $R_8$ are independently hydrogen, halo having an atomic weight of 19 to 36, or lower alkyl having 1 to 4 carbon atoms, e.g., methyl, ethyl, propyl, isopropyl, butyl or isobutyl;

$R_6$ and $R_7$ are independently, hydrogen, halo having an atomic weight of 19 to 36, lower alkyl having 1 to 4 carbon atoms, e.g., methyl, ethyl, propyl, isopropyl, butyl, or isobutyl or lower alkoxy having 1 to 4 carbon atoms, e.g., methoxy, ethoxy, propoxy, isopropxy, butoxy or isobutoxy;

$R_1$ and $R_2$ or $R_2$ and $R_3$ or $R_3$ and $R_4$ together are methylenedioxy;

$R_5$ and $R_6$ or $R_6$ and $R_7$ or $R_7$ and $R_8$ together are methylenedioxy; and X is —CH$_2$—, S or O;

provided that (1) maximum number of substituents on ring A and/or D is two, and (2) there are no adjacent trifluoromethyl groups.

The process for preparing the compounds of Formula I may be represented by the following reaction scheme A:

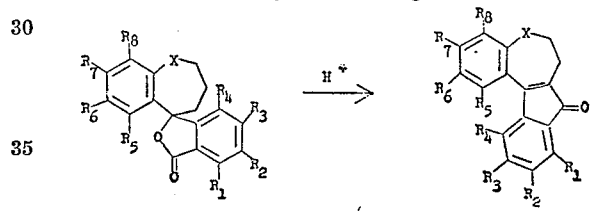

wherein $R_1$, $R_2$, $R_3$, $R_4$, $R_5$, $R_6$, $R_7$, $R_8$ and X have the above-stated significance.

The compounds of Formula I are prepared by treating a compound of Formula II with a concentrated mineral acid such as sulfuric acid or phosphoric acid, (sulfuric acid is preferred) at a temperature of from about —20 to 10° C. preferably from —10 to 0° C. for about 10 to 15 hours, preferably about 12 hours. The temperatures used are not critical. The compounds of Formula I may be recovered using conventional recovery techniques such as crystallization.

The compounds of Formula II may be prepared by the following reaction scheme B:

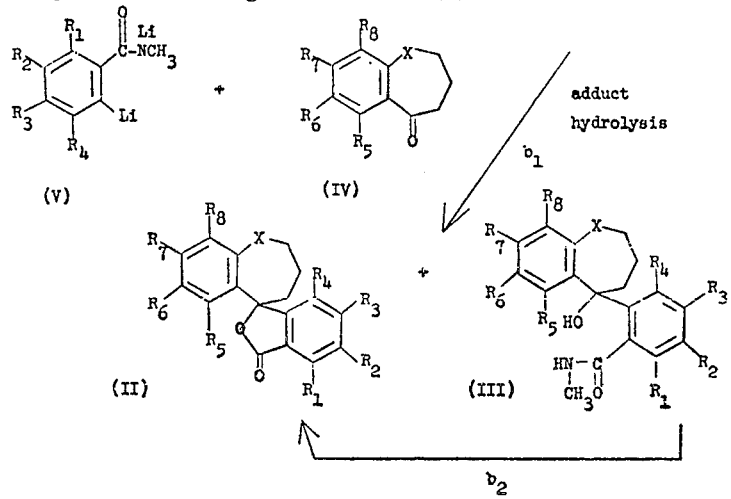

wherein $R_1$, $R_2$, $R_3$, $R_4$, $R_5$, $R_6$, $R_7$, $R_8$ and X have the above-stated significance.

The compounds of Formula II and Formula III are prepared by treating a compound of Formula V with a compound of Formula IV in the presence of an inert gas, in an inert solvent such as diethyl ether, tetrahydrofuran, hexane, heptane, benzene and the like and subjecting the reaction mixture to hydrolysis, preferably with aqueous ammonium chloride. This is represented by reaction scheme $b_1$. The reaction may be carried out at a temperature of from about —80 to —20° C., preferably —60 to —40° C. for about 1 to 3 hours.

Compound IV is preferably added in inert solvent (as described above) to a cold (—60 to —40° C.) inert solvent solution of Compound V. The solvents and the temperatures used are not critical. Compounds II may be separated from Compounds III by conventional means such as filtration and/or crystallization.

Compounds III may be converted into Compounds II by subjecting the reaction mixture of Compounds II and III from scheme $b_1$ in a solvent as described in process $b_1$, to a temperature of from 60° to the reflux temperature of the solvent, preferably from 100 to 120° C. for 15 to 48 hours, preferably 24 hours. This is represented by reaction scheme $b_2$.

Alternatively Compounds III may be separated (as described above) from Compounds II and treated as described in scheme $b_2$.

Neither the solvents nor the temperatures used are critical. The compounds of Formulas II and III may be recovered using conventional recovery techniques such as crystallization.

Certain of the compounds of Formula V are known and may be prepared by methods disclosed in the literature, e.g., by the following reaction scheme C:

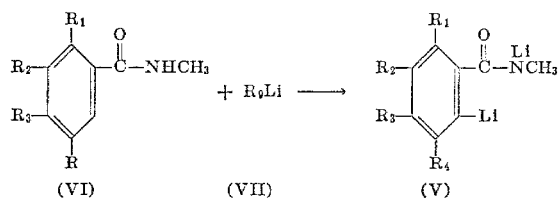

wherein $R_1$, $R_2$, $R_3$ and $R_4$ have the above-stated significance and $R_9$ is lower alkyl having 1 to 4 carbon atoms, e.g., methyl, ethyl, propyl, isopropyl, butyl or isobutyl.

The compounds of Formula V are prepared by treating a compound of Formula VI with an organo lithium compound of Formula VII in an inert solvent (as described in reaction scheme $b_1$) in the presence of an inert gas at a temperature of from about —10 to 10° C., preferably —5 to 5° C. for about 1 to 3 hours. The solvents and the temperatures used are not critical.

Certain of the compounds of Formulas IV, VI and VII are known and may be prepared according to methods disclosed in the literature. Those compounds of Formulas IV, VI and VII not specifically disclosed are prepared according to analogous methods from known materials.

The compounds of Formula I are useful because they possess pharmacological activity in animals. In particular, the compounds possess central nervous system activity and can be used as anti-depressants as indicated by their activity in the mouse in reversing reserpine hypothermia (Spencer, P.S.J., antagonism of Hypothermia in the Mouse by Anti-depressants, in Anti-depressant Drugs, pp. 194–204, eds., S. Garattini and N.N.G. Dukes, Excerpta Medica Foundation, 1967).

The compounds may be administered orally or parenterally.

The dosage administered will vary depending on the particular compound employed, the therapy desired and the severity of the condition being treated. In general, satisfactory results are obtained when the compounds are administered at a daily dosage of from about 1–30 mg./kg. of animal body weight, preferably given in divided doses, 2 to 4 times a day or in sustained release form. For most larger mammals (e.g., primates) the total daily dosage is from about 20 milligrams to about 100 milligrams. Dosage forms suitable for internal use comprise from about 5 milligrams to about 50 milligrams of the active compound in intimate admixture with a solid or liquid pharmaceutically acceptable carrier or diluent.

A representative formulation suitable for oral administration is a capsule prepared by standard techniques which contain the following:

| Ingredients: | Parts by weight |
|---|---|
| 6,7-dihydro-benz[b]indeno[1,2-d]thiepin-8(8H)-one | 25 |
| Inert filler (starch, kaolin, lactose etc.) | 275 |

EXAMPLE I 6,7-dihydro-benz[b]indeno[1,2-d]thiepin-8(8H)-one

STEP 1

2,3 - dihydro - spiro[1-benzothiepine-5(4H)-1'-phthalan] 3'-one and o-(2,3,4,5-tetrahydro - 5 - hydroxy-1-benzothiepin-5-yl)

To a flask equipped with a stirrer, dropping funnel, condenser and gas inlet tube and maintained under a nitrogen atmosphere there was added at room temperature 3.8 g. (0.027 mole) N-methyl benzamide and 75 ml. anhydrous tetrahydrofuran. The reaction flask was immersed in an ice bath and cooled to an internal temperature of 5°. Stirring was initiated and 38 ml. of 15% n-butyl lithium (0.06 mole) in hexane was added dropwise in about 40 minutes maintaining the temperature below 8°. The resulting N-methylbenzamide lithium adduct was stirred at 5° for 1 hour longer and then the reaction flask was immersed in a Dry-Ice acetone bath and cooled to an internal temperature of —60°. To the cold reaction mixture a solution of 5.35 g. (0.03 mole) of 3,4-dihydro-1-benzothiepin-5-(2H)-one in 30 ml. anhydrous tetrahydrofuran was added dropwise in about 30 minutes maintaining the temperature between —60 to —50°. The resulting adduct was stirred at —60° for 1 hour and then allowed to warm to 0° in about 1 hour and then treated with 35 ml. saturated ammonium chloride. The layers were separated and the organic phase was washed once with 30 ml. saturated ammonium chloride, dried over anhydrous $Mg_2SO_4$ and evaporated in vacuo. The resulting oil was triturated with ether and the o-(2,3,4,5-tetrahydro-5-hydroxy-1-benzothiepin - 5 - yl)-N-methyl benzamide, M.P. 128 to 130° C. was removed by filtration. The filtrate was evaporated in vacuo and the oil was crystallized from ether to give 2,3-dihydro-spiro[1-benzothiepin - 5(4H) - 1' - phthalan]-3'-one, M.P. 119–121° C.

STEP 2

6,7-dihydro-benz[b]indeno[1,2-d]thiepin-8(8H)-one 300 mg. (0.00106 mole) 2,3-dihydro-spiro[1-benzothiepin-5(4H)-1'-phthalan]-3'-one was added in portions to 10 ml. concentrated $H_2SO_4$ at 0°, the resulting solution was kept at 5° for 15 hours. At the end of this time the reaction mixture was poured with stirring onto 50 g. of crushed ice, the aqueous acid was extracted with two 50 ml. portions of methylene chloride. The methylene chloride was washed once with 50 ml. water, dried over $MgSO_4$ and evaporated in vacuo to give 6,7-dihydro-benz[b]indeno[1,2-d]thiepin-8(8H)-one, M.P. 133–138° C.

EXAMPLE II

By using the conditions of Example I, Step 1 and in place of N-methylbenzamide, starting with (1) N-methylbenzamide
(2) N-methylbenzamide
(3) N,4-dimethylbenzamide
(4) p-Chloro-N-methylbenzamide
(5) p-Methoxy-N-methylbenzamide
(6) N-methyl-benzamide (7) N-methyl-benzamide
(8) N-methyl-benzamide
(9) N-methyl-benzamide
(10) 3,5-bis(trifluoromethyl)-N-methylbenzamide
(11) 2-chloro-4-trifluoromethyl-N-methylbenzamide
(12) N,3-dimethylbenzamide
(13) 5-methoxy-N-methylbenzamide
(14) 3-methoxy-N-methylbenzamide
(15) 2-methoxy-N-methylbenzamide
(16) N,5-dimethylbenzamide and in place of 3,4-dihydro-1-benzothiepin-5-(2H)-one, starting with (1) 3,4-dihydro-1-benzoxaepin-5-(2H)-one
(2) 6,7,8,9-tetrahydro-1-benzocycloheptene-5-one
(3) 3,4-dihydro-1-benzothiepin-5-(2H)-one
(4) 3,4-dihydro-1-benzothiepin-5-(2H)-one
(5) 3,4-dihydro-1-benzothiepin-5-(2H)-one
(6) 7-methoxy-8-chloro-3,4-dihydro-1-benzothiepin-5-(2H)-one
(7) 7-methyl-8-methoxy-3,4-dihydro-1-benzothiepin-5-(2H)-one
(8) 7-chloro-8-methyl-3,4-dihydro-1-benzothiepin-5-(2H)-one
(9) 7,8-methylenedioxy-3,4-dihydro-1-benzothiepin-5-(2H)-one
(10) 3,4-dihydro-1-benzothiepin-5-(2H)-one
(11) 3,4-dihydro-1-benzothiepin-5-(2H)-one
(12) 6-chloro-3,4-dihydro-1-benzothiepin-5-(2H)-one
(13) 9-chloro-3,4-dihydro-1-benzothiepin-5-(2H)-one
(14) 9-methyl-3,4-dihydro-1-benzothiepin-5-(2H)-one
(15) 6-methyl-3,4-dihydro-1-benzothiepin-5-(2H)-one
(16) 3,4-dihydro-1-benzothiepin-5-(2H)-one, both the following intermediates of Formula II and Formula III are prepared:

FORMULA II (1) 2,3-dihydro-spiro[1-benzoxaepin-5(4H),1'-phthalan]-3'-one
(2) 6,7,8,9-tetrahydro-spiro[benzocycloheptene-5,1'-phthalan]-3'-one
(3) 2,3-dihydro-6'-methyl-spiro[1-benzothiepine-5(4H),1'-phthalan]-3'-one
(4) 6'-chloro-2,3-dihydro-spiro[1-benzothiepin-5(4H),1'-isobenzofuran]-3'-one
(5) 2,3-dihydro-6'-methoxy-spiro[1-benzothiepine-5(4H),1'-phthalan]-3'-one
(6) 8-chloro-2,3-dihydro-7-methoxy-spiro[1-benzothiepine-5(4H),1'-phthalan]-3'-one
(7) 2,3-dihydro-8-methoxy-7-methyl-spiro[1-benzothiepine-5(4H),1'-phthalan]-3'-one
(8) 7-chloro-2,3-dihydro-8-methyl-spiro[1-benzothiepine-5-(4H),1'-phthalan]-3'-one
(9) 2,3-dihydro-7,8-methylenedioxy-spiro[1-benzothiepine-5-(4H),1'-phthalan]-3'-one
(10) 2,3-dihydro-5',7'-bis(trifluoromethyl)-spiro[1-benzothiepine-5(4H),1'-phthalan]-3'-one
(11) 4'-chloro-2,3-dihydro-6'-methyl-spiro[1-benzothiepine-5-(4H),1'-phthalan]-3'-one
(12) 6-chloro-2,3-dihydro-5'-methyl-spiro[1-benzothiepine-5-(4H),1'-phthalan]-3'-one
(13) 9-chloro-2,3-dihydro-7'-methoxy-spiro[1-benzothiepine-5-(4H),1'-phthalan]-3'-one
(14) 2,3-dihydro-9-methyl-5'-methoxy-spiro[1-benzothiepine-5-(4H),1'-phthalan]-3'-one
(15) 6-methyl-2,3-dihydro-4'-methoxy-spiro[1-benzothiepine-5-(4H),1'-phthalan]-3'-one
(16) 2,3-dihydro-7'-methyl-spiro[1-benzothiepine-5(4H),1'-phthalan]-3'-one

FORMULA III (1) 2-[2,3,4,5-tetrahydro-5-hydroxy-1-benzoxepin-5-yl]-N-methyl-benzamide
(2) 2-[6,7,8,9-tetrahydro-5-hydroxy-5H-benzocyclohepten-5-yl]-N-methyl-benzamide
(3) 2-[2,3,4,5-tetrahydro-5-hydroxy-1-benzothiepin-5-yl]-N,4-dimethyl-benzamide
(4) 2-[2,3,4,5-tetrahydro-5-hydroxy-1-benzothiepin-5-yl]-N-methyl-4-chloro-benzamide
(5) 2-[2,3,4,5-tetrahydro-5-hydroxy-1-benzothiepin-5-yl]-N-methyl-4-methoxy-benzamide
(6) 2-[8-chloro-2,3,4,5-tetrahydro-5-hydroxy-7-methoxy-1-benzothiepin-5-yl]-N-methyl-benzamide
(7) 2-[2,3,4,5-tetrahydro-5-hydroxy-8-methoxy-7-methyl-1-benzothiepin-5-yl]-N-methyl-benzamide
(8) 2-[7-chloro-2,3,4,5-tetrahydro-5-hydroxy-8-methyl-1-benzothiepin-5-yl]-N-methyl-benzamide
(9) 2-[2,3,4,5-tetrahydro-5-hydroxy-7,8-methylenedioxy-1-benzothiepin-5-yl]-N-methyl-benzamide
(10) 2-[2,3,4,5-tetrahydro-5-hydroxy-1-benzothiepin-5-yl]-N-methyl-3,5-bis(trifluoromethyl)-benzamide
(11) 2-[2,3,4,5-tetrahydro-5-hydroxy-1-benzothiepin-5-yl]-N-methyl-4-trifluoromethyl-6-chloro-benzamide
(12) 2-[2,3,4,5-tetrahydro-5-hydroxy-6-chloro-1-benzothiepin-5-yl]-N,5-dimethyl-benzamide
(13) 2-[2,3,4,5-tetrahydro-5-hydroxy-9-chloro-1-benzothiepin-5-yl]-N-methyl-3-methoxy-benzamide
(14) 2-[2,3,4,5-tetrahydro-5-hydroxy-9-methyl-1-benzothiepin-5-yl]-N-methyl-5-methoxy-benzamide
(15) 2-[2,3,4,5-tetrahydro-5-hydroxy-6-methyl-1-benzothiepin-5-yl]-N-methyl-6-methoxy-benzamide
(16) 2-[2,3,4,5-tetrahydro-5-hydroxy-6-methyl-1-benzothiepin-5-yl]-N,3-dimethyl-benzamide Following the procedure of Example I, Step 2, and in place of 2,3 - dihydro-spiro[1 - benzothiepin-5(4H)-1'-phthalan]-3'-one, starting with the appropriate intermediate of Formula II of Step 1 of this example, the following products are obtained:

(1) 6,7-dihydro-8H-benz[b]indeno[1,2-d]oxepin-8-one
(2) 5,6-dihydro-dibenz[a,h]azulen-8(7H)-one
(3) 6,7-dihydro-11-methyl-benz[b]indeno[1,2-d]-thiepin-8(8H)-one
(4) 11-chloro-6,7-dihydro-benz[b]indeno[1,2-d]-thiepin-8(8H)-one
(5) 6,7-dihydro-11-methyl-benz[b]indeno[1,2-d]thiepin-8(8H)-one
(6) 3-chloro-6,7-dihydro-2-methoxy-benz[b]indeno-[1,2-d]thiepin-8(8H)-one
(7) 6,7-dihydro-3-methoxy-2-methyl-benz[b]indeno-[1,2-d]thiepin-8(8H)-one
(8) 2-chloro-6,7-dihydro-3-methyl-benz[b]indeno-[1,2-d]thiepin-8(8H)-one
(9) 6,7-dihydro-2,3-methylenedioxy-benz[b]indeno-[1,2-d]thiepin-8(8H)-one
(10) 6,7-dihydro-10,12-bis-trifluoromethyl-benz[b]-indeno[1,2-d]thiepin-8(8H)-one
(11) 9-chloro-6,7-dihydro-11-trifluoromethyl-benz[b]-indeno[1,2-d]thiepin-8(8H)-one
(12) 1-chloro-6,7-dihydro-10-methyl-benz[b]indeno-[1,2-d]thiepin-8(8H)-one
(13) 4-chloro-6,7-dihydro-12-methoxy-benz[b]indeno-[1,2-d]thiepin-8(8H)-one
(14) 6,7-dihydro-4-methyl-10-methoxy-benz[b]indeno-[1,2-d]thiepin-8(8H)-one
(15) 6,7-dihydro-1-methyl-9-methoxy-benz[b]indeno-[1,2-d]thiepin-8(8H)-one
(16) 6,7-dihydro-12-methyl-benz[b]indeno[1,2-d]-thiepin-8(8H)-one

EXAMPLE III

This example describes the procedure for preparing compounds of Formula I following the procedure of reaction schemes A, $b_1$, $b_2$ and C. The conditions of Example I, Steps 1 and 2, are followed, with the exception that the compounds of the hydrolysis reaction mixture of Step 1 (Example I) are not separated but instead are refluxed in anhydrous tetrahydrofuran to convert the intermediate of Formula III into the intermediate of Formula II.

STEP 1

By using the conditions of Example I, Step 1 and in place of N-methylbenzamide and 3,4-dihydro-1-benzothiepin-5-(2H)-one starting with (1) 3,4-methylenedioxy-N-methylbenzamide
(2) 3,4-dihydro-1-benzoxaepin-5-(2H)-one a reaction mixture of the following intermediates of Formula II and Formula III respectively are prepared:

(1) 2,3-dihydro - 5',6' - methylenedioxy-spiro[1 - benzoxepin-5(4H)-1'-phthalan]-3'-one
(2) 2-[2,3,4,5-tetrahydro - 5 - hydroxy - 1 - benzoxepin-5-yl]-N-methyl-4,5-methylenedioxy-benzamide

STEP 2

The reaction mixture of Step 1 of this example is refluxed in anhydrous tetrahydrofuran, and the resulting 2,3-dihydro - 5',6' - methylene-dioxy-spiro[1-benzoxepin-5(4H)-1'-phthalan]-3'-one is treated following the procedure of Example I, Step 2, to obtain the product, 6,7-dihydro - 10,11 - methylenedioxy-benz[b]indeno[1,2-d]-thiepin-8(8H)-one.

What is claimed is:
1. A compound of the formula

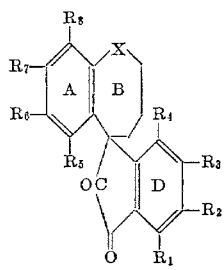

wherein $R_1$ is hydrogen, halo having an atomic weight of 19 to 36, or lower alkoxy having 1 to 4 carbon atoms;

$R_2$ and $R_4$ are independently hydrogen, lower alkyl having 1 to 4 carbon atoms, lower alkoxy having 1 to 4 carbon atoms or trifluoromethyl;

$R_3$ is hydrogen, halo having an atomic weight of 19 to 36, lower alkyl having 1 to 4 carbon atoms, lower alkoxy having 1 to 4 carbon atoms or trifluoromethyl;

$R_5$ and $R_8$ are independently hydrogen, halo having an atomic weight of 19 to 36, or lower alkyl having 1 to 4 carbon atoms;

$R_6$ and $R_7$ are independently hydrogen, halo having an atomic weight of 19 to 36, lower alkyl having 1 to 4 carbon atoms, or lower alkoxy having 1 to 4 carbon atoms;

$R_1$ and $R_2$ or $R_2$ and $R_3$ or $R_3$ and $R_4$ together are methylenedioxy; or $R_5$ and $R_6$ or $R_6$ and $R_7$ or $R_7$ and $R_8$ together are methylenedioxy; and X is —$CH_2$—, —S— or —O—;

provided that (1) maximum number of substituents on each of rings A and D is two, and (2) there are no adjacent trifluoromethyl groups.

References Cited

UNITED STATES PATENTS 3,687,975   8/1972   Houlihan et al. ____ 260—327 B

OTHER REFERENCES

Layton: Chem. Abs. 55:20615 (October 1961).

HENRY R. JILES, Primary Examiner

C. M. S. JAISLE, Assistant Examiner

U.S. Cl. X.R.

260—340.5, 343.3